(12) United States Patent
Quesnel et al.

(10) Patent No.: US 6,201,921 B1
(45) Date of Patent: Mar. 13, 2001

(54) FIBER OPTIC SPLICE ENCLOSURE

(75) Inventors: Wayne L. Quesnel, Moore; R. Bryan Gaines, Simpsonville; Eddie R. Adkins, Spartanburg, all of SC (US)

(73) Assignee: Alcoa Fujikura Limited, Brentwood, TN (US)

( * ) Notice: Subject to any disclaimer, the term of this patent is extended or adjusted under 35 U.S.C. 154(b) by 0 days.

(21) Appl. No.: 09/253,194

(22) Filed: Feb. 19, 1999

Related U.S. Application Data

(60) Provisional application No. 60/075,348, filed on Feb. 20, 1998.

(51) Int. Cl.[7] .................................................... G02B 6/00
(52) U.S. Cl. ............................................ 385/135; 385/137
(58) Field of Search .......................... 385/135, 134–137, 385/138, 139, 100, 95, 98, 99; 174/93, DIG. 8, 92

(56) References Cited

U.S. PATENT DOCUMENTS

| | | | |
|---|---|---|---|
| 5,249,253 | 9/1993 | Franckx et al. | 385/135 |
| 5,479,554 | 12/1995 | Roberts | 385/135 |
| 5,481,639 | * 1/1996 | Cobb et al. | 385/135 |
| 5,509,099 | 4/1996 | Hermsen et al. | 385/134 |
| 5,631,993 | 5/1997 | Cloud et al. | 385/135 |
| 5,862,290 | 1/1999 | Burek et al. | 385/135 |
| 5,883,999 | 3/1999 | Cloud et al. | 385/135 |
| 5,884,000 | 3/1999 | Cloud et al. | 385/135 |
| 5,884,001 | 3/1999 | Cloud et al. | 385/135 |
| 5,884,002 | 3/1999 | Cloud et al. | 385/135 |
| 5,884,003 | 3/1999 | Cloud et al. | 385/135 |

FOREIGN PATENT DOCUMENTS

| | | | |
|---|---|---|---|
| 367477 | 5/1990 | (EP) | G02B/6/44 |
| 505104 | 9/1992 | (EP) | G02B/6/44 |
| 514174 | 11/1992 | (EP) | G02B/6/44 |
| 657756 | 6/1995 | (EP) | G02B/6/44 |
| 9632660 | 10/1996 | (WO) | G02B/6/44 |

* cited by examiner

*Primary Examiner*—Phan T. H. Palmer
(74) *Attorney, Agent, or Firm*—Tracey D. Beiriger

(57) ABSTRACT

The splice enclosure of this invention provides an environmentally safe means for splicing, or joining together, two or more fiber optic cables. This particular enclosure is designed to handle re-entry for possible future splicing of cables not currently active, the addition of more cables or servicing of the existing cables. Further, the enclosure can be mounted to a support structure via mounting plates and fasteners or can be banded to the support structure. The enclosure includes a weather and impact resistant casing and a covered drawer that can be easily removed from the casing and taken to an area wherein splicing can be conducted. The drawer includes a splice tray retaining area that can accommodate several splice trays at a time. Further, the drawer includes a buffer tube storage area where stored buffer tubes will not exceed desired bend radius. Compared to existing splice enclosures, this invention exhibits a higher fiber count capacity, weighs and costs less to manufacture, is more corrosion and ballistic resistant, accommodates larger diameter cables and may be pressurized for environmental sealability.

32 Claims, 5 Drawing Sheets

FIBER OPTIC SPLICE ENCLOSURE

CROSS REFERENCE TO RELATED APPLICATIONS

This application claims the benefit of U.S. Provisional Application Serial No. 60/075,348, filed on Feb. 20, 1998, the disclosure of which is fully incorporated by reference herein.

FIELD OF THE INVENTION

This invention relates to a fiber optic splice enclosure for various types of fiber optic cables. The enclosure provides a contained environment that protects the spliced cables from exposure at the splice points once splicing is completed. Further, the enclosure provides a removable drawer that accommodates various splice trays designs and can be easily transported to an environment suitable to perform the required splicing. Further, the enclosure accommodates many tray simultaneously. Such splice enclosures are secured to poles, towers or other fiber optic cable support structures.

BACKGROUND OF THE INVENTION

Fiber optic cables are widely used for data transmission. These cables are suspended from support structures such as existing high tension electrical towers. Often these fiber optic cables need to be spliced during initial installation to connect different cable runs, and once in operation, for adding additional cable runs, rerouting, maintenance or repair. It is important that this splicing does not interrupt the total data transmission of the cables involved. Because each of these fiber optic cables typically carry hundreds of thousands of different transmission lines via individual fibers, a complete disruption of the cable continuity is not acceptable when access to, for instance, a single fiber is desired. Thus, access must be provided to the individual transmission lines or fibers to implement a new splice at a portion of a fiber optic cable without totally disrupting the continuity of all the associated bundled fibers.

U.S. Pat. Nos. 5,007,701 ('701 patent) and 5,479,554 ('554 patent) both disclose a splice closure apparatus in which a rigid, cylindrical and weather impervious outer structure is open at both ends. A pair of end caps each include an elastomeric sealing material sandwiched between a pair of rigid plates. At least one of the end caps has openings for the passage of cables into the interior of the closure where an anchoring member is positioned to receive the cable ends and secure a splice. The elastomeric sealing material in each end cap is compressed against the sides of the outer cylinder by the plates on either side when a number of through bolts are tightened, thus forming a weather tight seal between each end cap and the cylinder wall. In addition, in each end cap with cable openings, the elastomeric material is simultaneously urged tightly against the cables, thus also forming a weather tight seal between the end cap and the cables. While use of the elastomeric sealing material is suitable under typical weather conditions, it often is not suitable under extreme weather conditions. After exposure to extreme cold or hot temperature, the elastomeric material loses its ability to contract and expand properly. Other disadvantages to existing splice enclosures include a lack of ease of splicing together adjoining cables or cable connections.

There is a need for a splice enclosure that includes plentiful fiber unit storage, large fiber space capacity and can accommodate various types and sizes of cables. Further, a splice enclosure is needed that is easy to use and that minimizes disturbance to previously spliced cables contained within the device when additional spliced cable are added or existing spliced cables are serviced.

SUMMARY OF THE INVENTION

The splice enclosure of this invention provides an environmentally safe means for splicing, or joining together, two or more fiber optic cables. This particular enclosure is designed to handle re-entry for possible future splicing of cables not currently active, the addition of more cables or servicing of the existing cables. Further, the enclosure can be mounted to a support structure via mounting plates and fasteners or can be banded to the support structure.

The enclosure includes a weather and impact resistant casing and a covered drawer that can be easily removed from the casing and taken to an area wherein splicing can be conducted. A gasket affixed to the drawer, provides a seal between the drawer and the casing without the use of messy sealants and retains the required assembly hardware thus minimizing loose parts.

The drawer includes a splice tray retaining area that can accommodate several splice trays at a time. Further, the drawer includes a buffer tube storage area where the stored buffer tubes will not exceed their desired bend radius. The drawer also includes a strength member support. A variety of cable strength members, including strength member typically used with ADSS, Opt-GW and HFC cable, may be tied off, or rigidly attached with this design.

Compared to existing splice enclosures, this invention exhibits a higher fiber count capacity, weighs and costs less to manufacture, is more corrosion resistant, accommodates larger diameter cables and may be pressurized for environmental sealability and verification of proper installation.

An objective of this invention is to provide a splice enclosure capable of accommodating various types and sized cables.

Another objective of this invention is to provide a lightweight splice enclosure.

Yet another objective of this invention is to provide a splice enclosure having the ability to accommodate high fiber count.

A further objective of this invention is to provide a splice enclosure that can be fastened or banded to a support structure.

A further objective still of this invention is to provide a splice enclosure that can be easily installed, and can be accessed and re-accessed without disturbing previously installed splices.

Yet a further object of this invention is to provide a splice enclosure capable of accommodating various splice trays.

Another objective of this invention is to provide a splice enclosure that is bullet resistant.

BRIEF DESCRIPTION OF THE DRAWINGS

Further features, objectives and advantages of the invention over existing units will become clearer with a detailed description of this splice enclosure made with reference to the accompanying drawings in which.

DETAILED DESCRIPTION

Figure 1:
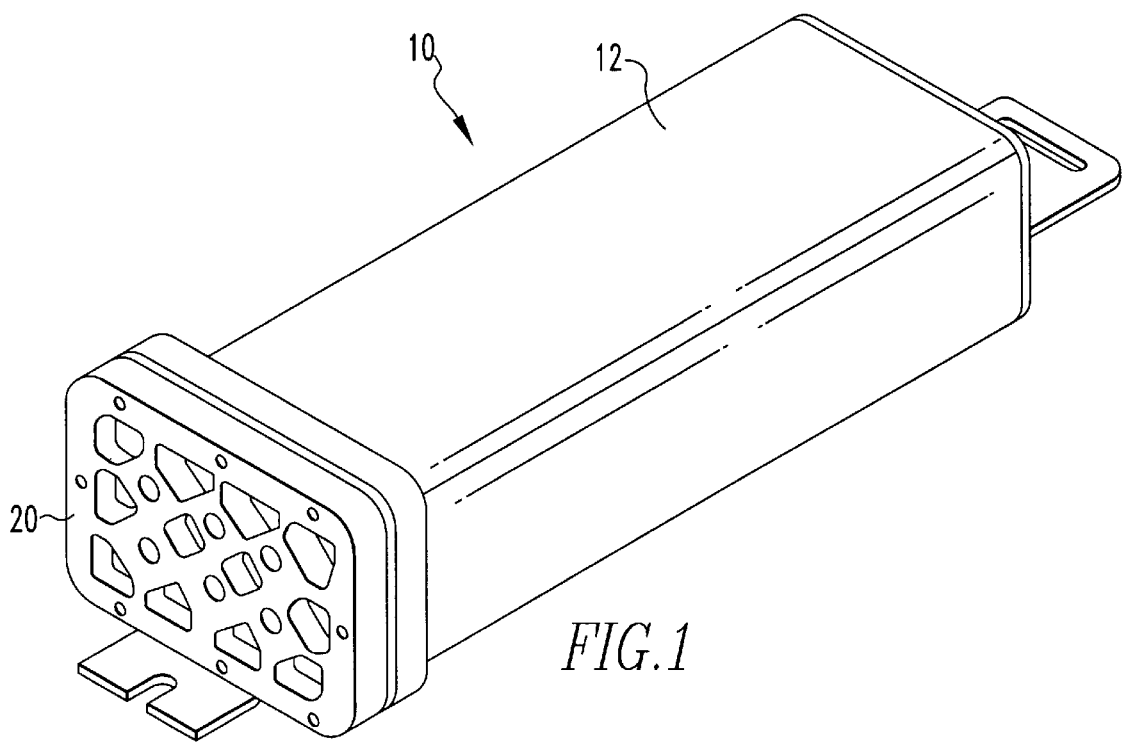
FIG. 1 is a perspective view of the splice enclosure.
Figure 2:
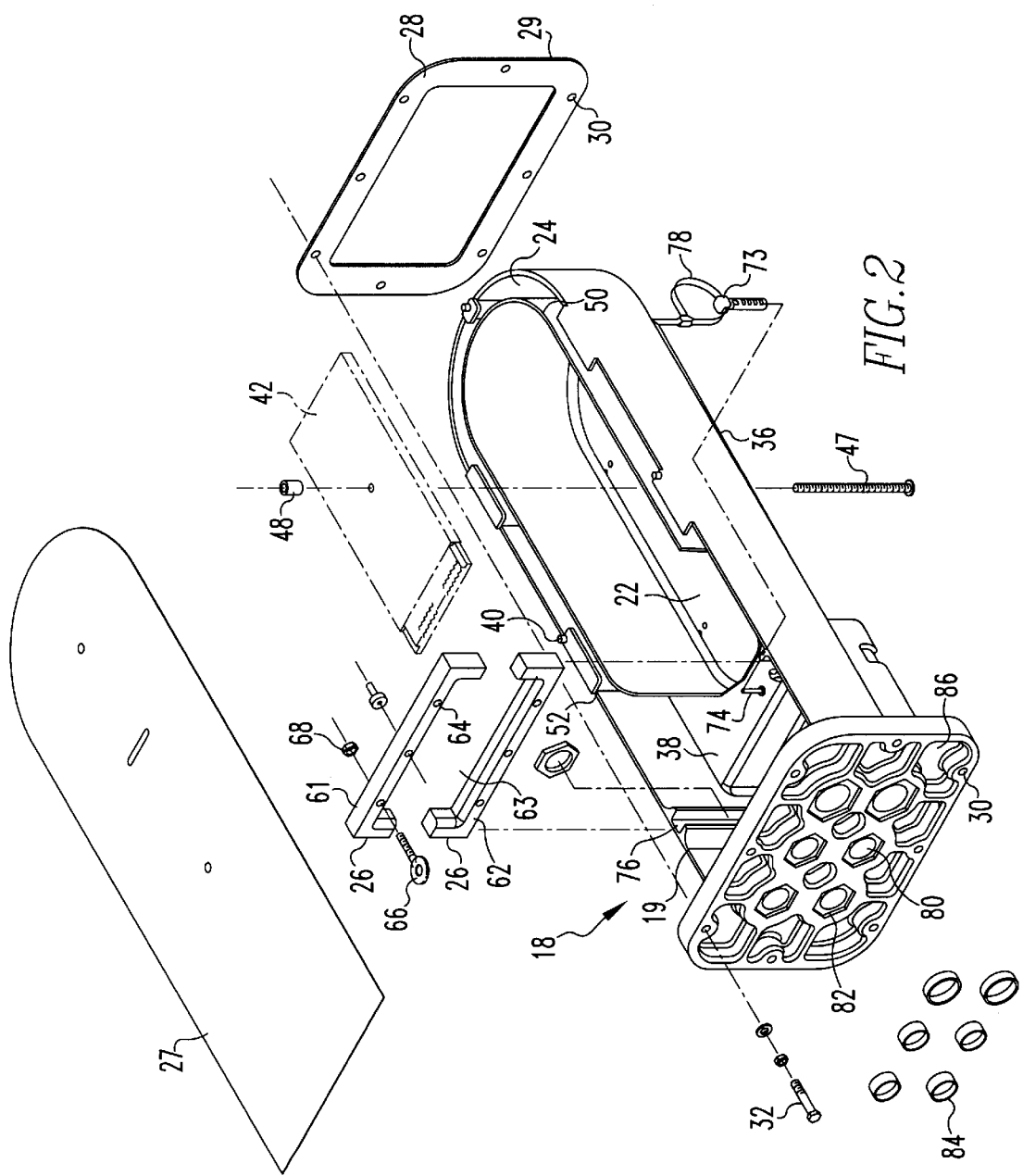
FIG. 2 is a perspective view of the splice enclosure in an unassembled, exploded view.

Referring to FIG. 1, a perspective view of the fully assembled splice enclosure 10 is shown. As seen in FIG. 2, splice enclosure 10 includes a outer casing 12 that has a first flanged end 14 and a second end 16. Splice enclosure 10 also includes a drawer 18 which is removable from casing 12 through opening 92 of first end 14 of casing 12. Drawer 18 has a flanged front face 20, a splice tray retaining area 22, a buffer tube storage groove 24 and a strength member support 60 which is completely separable from drawer 18. Drawer 18 also has a completely separable cover 27 that snaps onto upper surface 19 of drawer 18. Drawer cover 27 snaps onto drawer 18 via raised buttons 40 located on the top surface 19 of drawer 18. Drawer cover 27 includes corresponding openings (not shown) to receive raised buttons 40. Cover 27 prevents objects from falling into drawer 18 and insures nothing will fall out of drawer 18 when it is removed from casing 12.

Figure 3:
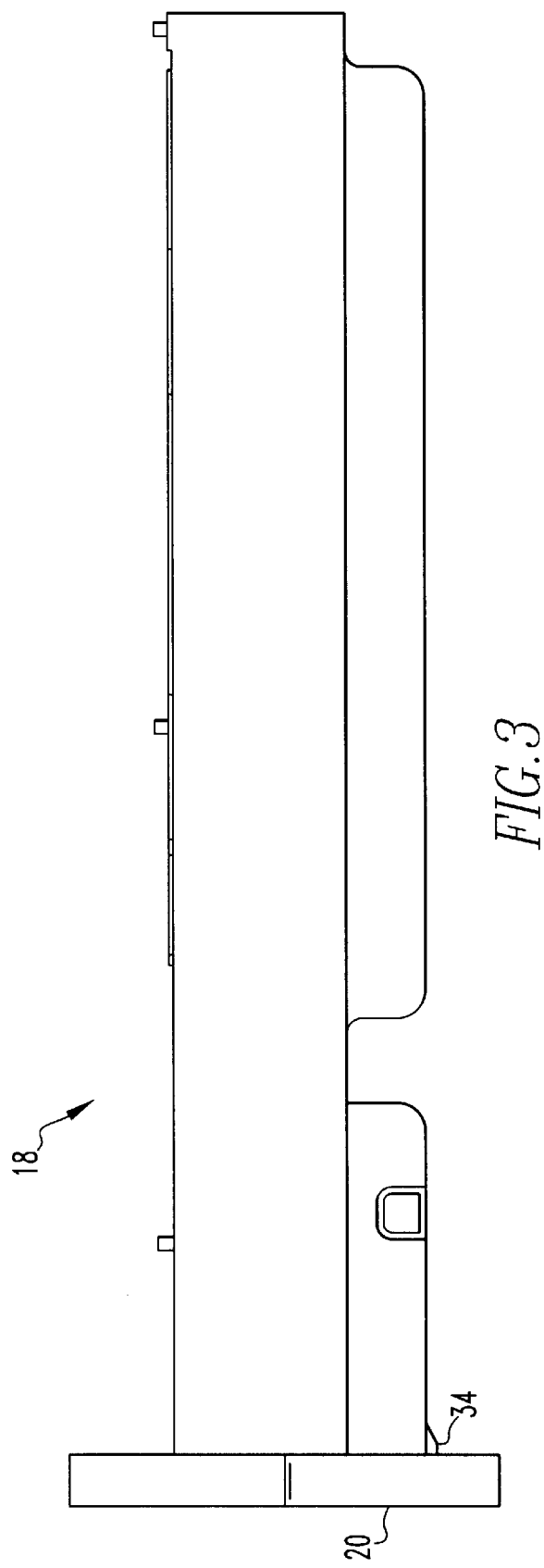
FIG. 3 is a side view of the drawer of the splice enclosure.

A gasket 28 affixes to drawer 18 and provides a seal between casing 12 and drawer 18. Gasket 28, first flanged end 14 of casing 12 and flanged front face 20 of drawer 18 are provided corresponding openings 30 for receiving fasteners 32 such as hex head cap screws to assemble splice enclosure 10. That is, gasket 28 is sandwiched between flanged end 14 of casing 12 and flanged front face 20 of drawer 18 when drawer 18 is inserted into casing 12. When drawer 18 is inserted into casing 12, wedges 34 located on bottom surface 36 of drawer 18, as shown in FIG. 3, elevate drawer 18 slightly to properly align drawer 18 and casing 12. During any assembly and disassembly of enclosure 10, gasket 28 is easily held in place on flanged front face 20 of drawer 18 by an adhesive on back side 29 of gasket 28, such as two-sided tape, until fasteners 32 secure drawer 18 in casing 12. Gasket 28 does not require adhesive to properly seal drawer 18 and casing 12.

Figure 4:
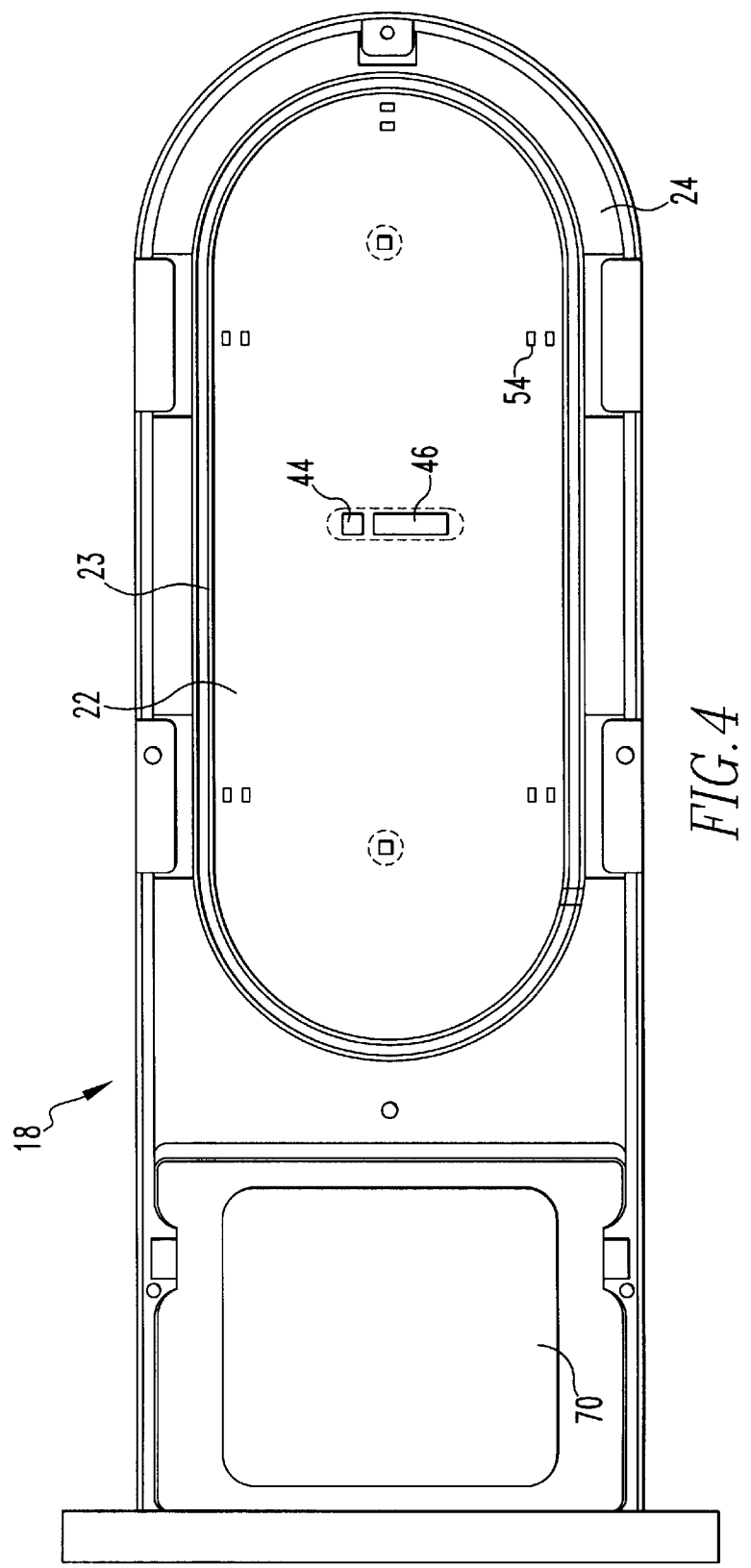
FIG. 4 is a top view of the drawer shown in FIG. 3.

Drawer 18 can accommodate one or more splice trays 42 within splice tray retaining area 22. As shown in FIG. 4, slots 44 and 46 located within splice tray retaining area 22 aid in insuring that the bottom most inserted tray 42 is tightly fixed within the retaining area 22 in the desired position. Although it may not be necessary to use slots 44 and 46 depending on the splice tray, when used these slots can prevent unwanted movement of the trays. If square slot 44 is used, splice tray 42 will be retained against a side surface 23 of retaining area 22 whereas if rectangular slot 46 is used, splice tray 42 will be centered within retaining area 22. Note that slots can be both positioned and sized to accommodate various designed splice trays and are configured to correspond with a boss (not shown) located on the bottom surface of the splice tray. Also retaining area 22 is designed to accommodate stacking of splice trays thus allowing splice enclosure 10 to simultaneously handle up to 15 trays. A fastener such as bolt 47 and nut 48 can be used to retain the splice tray or trays 42 in the retaining area 22. It is important to understand that drawer 18 is designed to accommodate removal of the splice trays to allow easy access to existing spliced cables with minimum disturbance to the other trays positioned therein.

Drawer 18 includes buffer tube storage groove 24 for storing extra buffer tube within splice enclosure 10. Buffer tube storage groove 24 is designed such that buffer tube stored therein will maintain a bend radius that will not cause attenuation, or light signal loss. In a preferred embodiment, raised wall 50 and molded tabs 52 retain the stored cable within the aforesaid storage groove 24. Raised wall 50 also facilitates routing of the buffer tube such that the proper bend radius is not exceeded. Further, drawer 18 provides tie wrap slots 54 to accommodate, if necessary the tying down of buffer tubes from various splice tray configurations.

On a preferred basis, drawer 18 of this device also includes a strength member support 60 that is formed in at least two sections. The upper portion 61 of this support 60, is designed for removal from and reinstallation in drawer 18, thus making tie-off of the strength member easier. This two piece design also allows for buffer tube routing through the sections, thus providing an unobstructed pathway for storage of the buffer tube. That is, when upper portion 61 and lower portion 62 of strength member support 60 mate, an opening 63 is formed through which buffer tube can extend. The strength member support provides openings 64 to receive eye bolts 66 when necessary. When the strength member is tied about support 60 and nuts 68 are installed on the eye bolts and tightened, tension is created on the strength member. Note that the strength member can also be threaded directly through openings 64 rather than using eye bolts 66. A variety of strength members, including that of ADSS, Opt-GW and HFC cable, may be tied off, or rigidly attached with this design.

Drawer 18 is also provided with at least one opening 70, preferably a bottom opening to permit easy access to ting off the strength member onto the strength member support 60. Further, drawer 18 also includes a tie retainer 73 secured within opening 74 located on bottom surface 36 of drawer 18 and adjacent buffer tube storage groove 24. Tie retainer 73 opens to receive bundled buffer tubes and then is closed and rotated in opening 74 to facilitate tie down of the buffer tube. An adjustable and reusable strap 78 is used for the tie down. This tie down system permits easy access to the buffer bundle.

Drawer 18 is also provided strength member support retaining slots 76. These slots 76 are designed to retain strength member support 60 to a tension of pull when strength member is wrapped about support 60.

Front face 20 of drawer 18 contains ports 80 for receiving buffer tubes. Preferably ports 80 have a hexagonal recess 82 to prevent connectors (not shown) from tuning. Brass press fit plugs 84 may be used before insertion of the connectors into ports 80. Plugs 84 create a seal when installed and can be knocked out of ports 80 when connectors need to be placed into ports 80. Note that various sized recesses 82 can be formed on front face 20 of drawer 18. Preferably additional openings 86 are provided on front face 20 of drawer 18 to lighten overall weight of the enclosure. Note that enclosure 10 can accommodate up to six buffer tubes simultaneously.

Landing 38 of drawer 18 is positioned at an optimum height to accommodate buffer tube entering through any of ports 80 without causing attenuation. Note that landing 38 forms the base of buffer tube storage groove 24.

Figure 5:
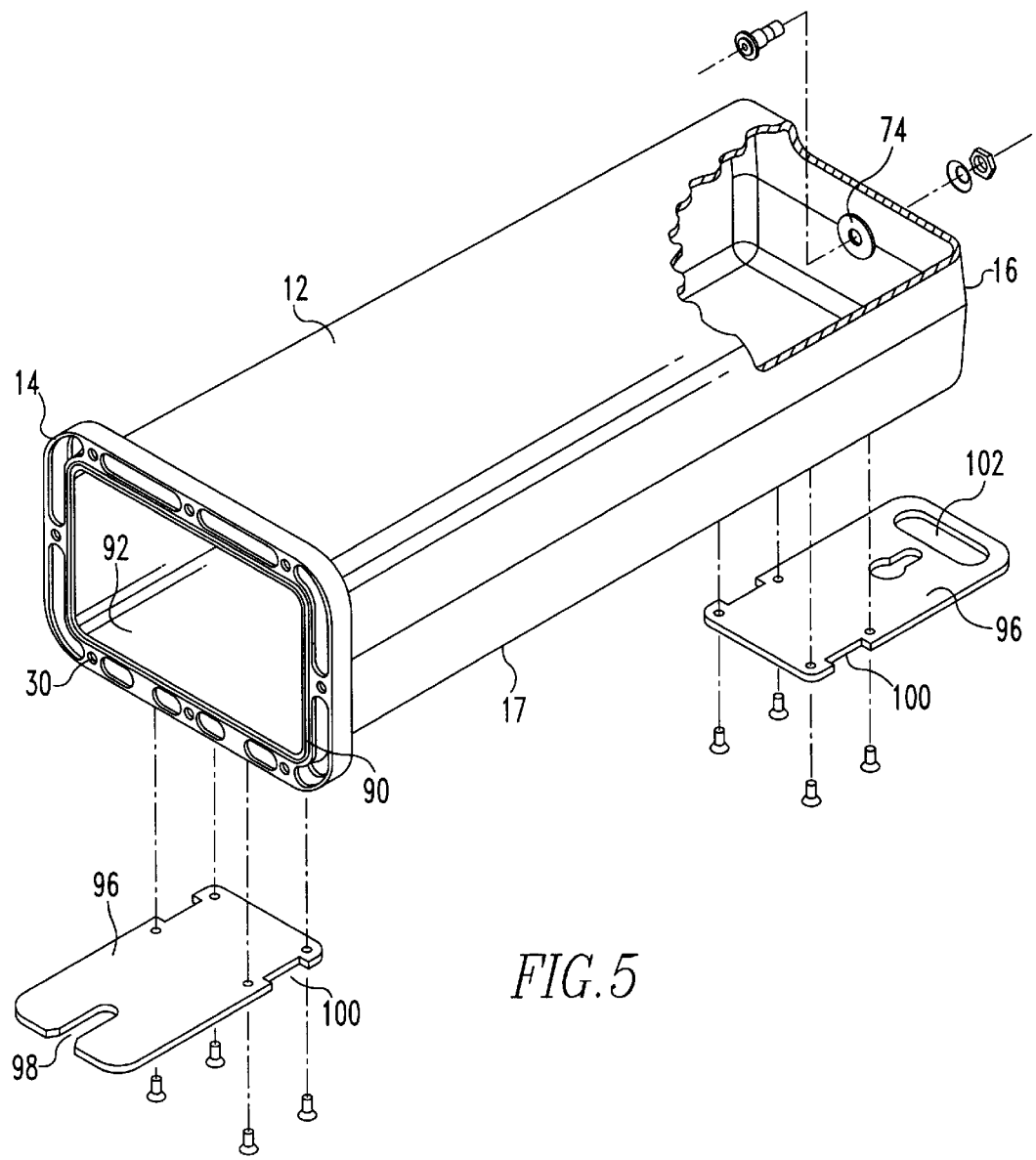
FIG. 5 is a perspective view of casing of the splice enclosure.

As shown in FIG. 5, first end 14 of casing 12 includes a raised bead 90 around opening 92 of casing 12. Raised bead 90 provides a water-tight seal when drawer 18 is contained within casing 12. No other sealants are necessary. Second end 16 of casing 12 includes a pressure valve 94 that can be used to ensure proper sealing has occurred and to purge enclosure 10 of any moisture if required. On a preferred basis, splice enclosure 10 is air tight and can be pressurized with air or inert gas up to about 30 psi.

Attached to the bottom surface 17 of casing 12 are one or more mounting plates 96 though it is to be understood that casing 12, itself, may also be band mounted to a pole or other support structure in the alternative. Mounting plate 96 as designed facilitates either fastener mounting or band mounting. Slots 98 are configured to mate with the studs to which enclosure 10 will attach. Cut out notches 100 have also been provided on mounting plates 96 to ease the transition of a band as it goes around a support structure. Note also that mounting plate 96 may also include hand hole 102 that can be used to handle enclosure 10.

Casing 12 is preferably made from an injection molded plastic material, which is also preferably corrosion, ballistic and ultraviolet resistant, thereby eliminating the need for a much heavier, low fiber-capacity iron casing. Enclosure 10 including both casing 12 and drawer 18 weighs approximately only 22 pounds. With the drawer-casing arrangement, the splice enclosure system of this invention accommodates drawer removal from a support mounted casing for easier, safer cable splicing from ground level in an appropriate environmentally controlled area.

Having described the presently preferred embodiments, it is to be understood that the invention may be otherwise embodied within the scope of the appended claims.

What is claimed is:

1. A fiber optic splice enclosure comprising:
   a casing having an opening;
   a drawer positioned within said casing and removable from said casing through said opening in said casing, said drawer having a retaining area for holding at least one fiber optic splice tray; and
   a drawer cover received on an upper surface of said drawer to prevent objects from unintentionally entering into or falling out of said drawer.

2. A fiber optic splice enclosure as in claim 1 wherein said opening of said casing has a raised bead which provides a seal when said drawer is contained in said casing.

3. A fiber optic splice enclosure as in claim 1 wherein said drawer can hold more than one splice tray.

4. A fiber optic splice enclosure as in claim 1 wherein said drawer can simultaneously hold up to 15 splice trays.

5. A fiber optic splice enclosure as in claim 1 which can accommodate up to and including 384 fiber splices.

6. A fiber optic splice enclosure as in claim 1 wherein said splice tray has a bottom surface and said bottom surface has a boss, and said retaining area includes at least one slot for receiving said boss of said splice tray such that movement of said splice tray within said retaining area is eliminated.

7. A fiber optic splice enclosure as in claim 1 wherein said casing is made via injection molding.

8. A fiber optic splice enclosure as in claim 1 wherein said casing is made from a plastic material which is corrosion, ballistic and ultraviolet resistant.

9. A fiber optic splice enclosure as in claim 1 wherein said casing is made from a plastic material which is weather and impact resistant.

10. A fiber optic splice enclosure as in claim 1 further comprising:
    a gasket, said gasket fixedly attached to said drawer and providing a seal between said casing and said drawer when said drawer is inserted into said casing.

11. A fiber optic splice enclosure as in claim 10 wherein two-side tape fixedly attaches said gasket to said drawer.

12. A fiber optic splice enclosure as in claim 1 having means to accommodate various types of said splice trays.

13. A fiber optic splice enclosure as in claim 1 further comprising:
    means to bolt said enclosure to a support structure.

14. A fiber optic splice enclosure as in claim 1 further comprising:
    means to band said enclosure to a support structure.

15. A fiber optic splice enclosure as in claim 1 wherein said enclosure has a weight of approximately 22 pounds when not retaining any splice trays or holding any fiber optic buffer tube.

16. A fiber optic splice enclosure as in claim 1 wherein said enclosure accommodates various types and sized fiber optic cables.

17. A fiber optic splice enclosure as in claim 1 wherein said enclosure accepts up to six cables.

18. A fiber optic splice enclosure as in claim 1 wherein said casing has a pressure valve to facilitate verification of proper sealing of said enclosure.

19. A fiber optic splice enclosure as in claim 1 further comprising means to align said drawer within said casing.

20. A fiber optic splice enclosure as in claim 1 wherein said drawer further comprises a buffer tube storage groove for holding and retaining fiber optic buffer tube.

21. A fiber optic splice enclosure as in claim 20 wherein said buffer tube storage area groove is designed such that fiber optic cable retained therein will maintain a bend radius that will not cause attenuation or light loss.

22. A fiber optic splice enclosure as in claim 20 wherein said buffer tube storage area groove includes means to retain said fiber optic cable in said storage area.

23. A fiber optic splice enclosure as in claim 22 wherein said drawer further comprises:
    a tie retainer, said tie retainer positioned adjacent said buffer tube storage groove and facilities tie down of said buffer tube.

24. A fiber optic splice enclosure as in claim 1 wherein said drawer further comprises:
    a strength member support, said support having at least two sections, said one of said sections removable to facilitate ease of tie-off of strength member of buffer tube held within said enclosure.

25. A fiber optic splice enclosure as in claim 23 wherein said strength member support provides an opening for receiving said buffer tube and providing an unobstructed pathway for said buffer tube.

26. A fiber optic splice enclosure as in claim 23 wherein said drawer further comprises:
    an opening to provide easy access to said strength member support to facilitate tie-off of said buffer tube.

27. A fiber optic splice enclosure as in claim 24 wherein said strength member support has means to secure said strength member to said support.

28. A fiber optic splice enclosure as in claim 1 wherein said casing has a front face providing ports for receiving buffer tubes.

29. A fiber optic splice enclosure as in claim 28 wherein said ports have a hexagonal recess to prevent inserted connectors from rotating.

30. A fiber optic splice enclosure comprising:
    a casing having an opening; and
    a drawer positioned within said casing and removable from said casing through said opening in said casing, said drawer having an outer wall and an inner wall spaced apart from said outer wall, said inner wall surrounding a retaining area for holding at least one fiber optic splice tray.

31. A fiber optic splice enclosure as in claim 30 wherein said outer wall and said inner wall define a buffer tube storage groove for holding and retaining a fiber optic buffer tube.

32. A fiber optic splice enclosure as in claim 31 wherein said buffer tube storage area groove maintains a bend radius in a fiber optic cable retained therein without attenuation or light loss.

* * * * *